US006794417B2

(12) United States Patent
O'Beck et al.

(10) Patent No.: US 6,794,417 B2
(45) Date of Patent: Sep. 21, 2004

(54) SYSTEM AND METHOD FOR TREATMENT OF WATER AND DISPOSAL OF CONTAMINANTS PRODUCED BY CONVERTING LIGHTER HYDROCARBONS INTO HEAVIER HYDROCARBON

(75) Inventors: John T. O'Beck, Tulsa, OK (US); Rex C. Tendick, Tulsa, OK (US)

(73) Assignee: Syntroleum Corporation, Tulsa, OK (US)

( * ) Notice: Subject to any disclaimer, the term of this patent is extended or adjusted under 35 U.S.C. 154(b) by 0 days.

(21) Appl. No.: 10/175,602

(22) Filed: Jun. 19, 2002

(65) Prior Publication Data

US 2002/0177629 A1 Nov. 28, 2002

(51) Int. Cl.[7] .............................. C07C 27/00; F02C 3/00
(52) U.S. Cl. ........................ 518/700; 518/702; 518/703; 518/704; 60/39.02
(58) Field of Search ................................ 518/700, 702, 518/703, 704; 60/39.02

(56) References Cited

U.S. PATENT DOCUMENTS

| | | | |
|---|---|---|---|
| 1,746,464 A | 2/1930 | Agee et al. ................. 518/700 |
| 1,798,288 A | 3/1931 | Witzel et al. | |
| 2,247,087 A | 6/1941 | Herbert ...................... 260/449 |
| 2,468,494 A | 4/1949 | Griffin, Jr. ............... 260/449.6 |
| 2,472,427 A | 6/1949 | Johnson ................... 260/449.6 |
| 2,486,243 A | 10/1949 | Atwell ..................... 260/449.6 |
| 2,518,337 A | 8/1950 | Krebs ......................... 260/449 |
| 2,552,308 A | 5/1951 | Buchmann et al. ...... 260/449.6 |
| 2,552,737 A | 5/1951 | Rees ........................... 48/214 |
| 2,579,828 A | 12/1951 | Johnson ................... 260/449.6 |
| 2,583,611 A | 1/1952 | Sullivan, Jr. ............. 260/449.6 |
| 2,615,911 A | 10/1952 | Williams ................. 260/449.6 |
| 2,617,709 A | 11/1952 | Cornell ............................ 23/1 |
| 2,640,843 A | 6/1953 | Hill et al. ................ 260/449.6 |
| 2,660,032 A | 11/1953 | Rosenthal .................. 60/39.02 |
| 2,686,195 A | 8/1954 | McAdams et al. ....... 260/449.6 |
| 3,549,335 A | 12/1970 | Grotz, Jr. ..................... 23/268 |
| 3,673,218 A | 6/1972 | Caims et al. ............ 260/345.2 |
| 3,765,167 A | 10/1973 | Rudolph et al. ........... 60/39.02 |
| 3,866,411 A | 2/1975 | Marlon et al. ............. 60/39.02 |
| 3,868,817 A | 3/1975 | Marion et al. ............. 60/39.02 |
| 3,920,579 A | 11/1975 | Slater ......................... 252/373 |
| 3,958,625 A | 5/1976 | Wentorf, Jr. .................. 165/2 |
| 3,959,972 A | 6/1976 | Rudolph et al. .............. 60/651 |
| 3,986,349 A | 10/1976 | Egan ........................ 60/39.02 |
| 4,048,250 A | 9/1977 | Garwood et al. ........... 260/683 |
| 4,067,190 A | 1/1978 | Hamm et al. .............. 60/39.69 |
| 4,074,981 A | 2/1978 | Slater ........................... 48/197 |
| 4,075,831 A | 2/1978 | McGann ..................... 60/39.05 |
| 4,092,825 A | 6/1978 | Egan ........................ 60/39.02 |
| 4,121,912 A | 10/1978 | Barber et al. ................ 48/197 |
| 4,132,065 A | 1/1979 | McGann ..................... 60/39.02 |
| 4,147,456 A | 4/1979 | Klass ......................... 405/210 |
| 4,158,637 A | 6/1979 | Jones ......................... 208/499 |
| 4,158,680 A | 6/1979 | McGann ..................... 261/149 |

(List continued on next page.)

FOREIGN PATENT DOCUMENTS

| | | | |
|---|---|---|---|
| AU | 83575/82 | 1/1985 | ............. C07C/1/04 |
| AU | 17172/92 | 1/1992 | ......... C01B/003/38 |
| AU | 29777/92 | 1/1993 | ......... C07C/001/04 |
| BE | 414019 | 1/1936 | |
| EP | 0 212 755 | 1/1986 | ............. C01B/3/02 |
| EP | 0 261 771 | 1/1987 | ........... C07C/20/15 |
| EP | 0 103 914 | 1/1988 | ........... F01K/23/06 |
| EP | 0 497 425 A1 | 1/1992 | ............. C10J/3/00 |
| EP | 0 501 331 B1 | 1/1992 | ......... C07C/29/151 |
| EP | 0 503 482 B1 | 1/1992 | ............. C01B/3/02 |
| EP | 0 516 441 A1 | 1/1992 | ............. C07C/1/04 |
| EP | 0 601 886 A1 | 1/1993 | ............. C07C/1/04 |
| EP | 0 748 763 A1 | 12/1996 | ............. C01B/3/36 |
| FR | 871230 | 4/1942 | ...................... 14/4 |
| FR | 922493 | 1/1947 | ...................... 14/4 |
| FR | 1537457 | 1/1968 | |
| GB | 2103647 B | 2/1983 | ............. C07C/1/04 |
| GB | 2 139 644 A | 11/1984 | .......... C01B/03/36 |
| JP | A60007929 | 1/1985 | ............. B01J/8/06 |
| JP | 364142 | 1/1991 | .......... C07C/31/04 |
| WO | WO 88/05775 | 1/1986 | ............. C07C/1/06 |
| WO | WO 93/06041 | of 1993 | .......... C01B/21/00 |
| WO | WO 95/24961 | of 1995 | ............. B01J/8/04 |
| WO | WO 97/33847 | of 1997 | ............. C07C/1/04 |
| WO | WO 97/30011 | 8/1997 | ............. C07C/7/06 |
| WO | WO 99/15483 | 4/1999 | ............. C07C/1/04 |
| WO | WO 99/19277 | 4/1999 | ............. C07C/1/04 |
| WO | WO 00/34414 | 6/2000 | ............. C10G/2/00 |

OTHER PUBLICATIONS

"Autothermal Reforming," Hydrogen Processing Apr. 1984.
"Produce Diesel from Gas," Hydrocarbon Processing, May 1983.
"Syn Gas from Heavy Fuels" by Kuhre, et al, Hydrocarbon Processing, pp. 113–117, Dec. 1971.
"The Syntroleum Process", 1996.

(List continued on next page.)

\* cited by examiner

*Primary Examiner*—J. Parsa
(74) *Attorney, Agent, or Firm*—Baker Botts L.L.P.

(57) ABSTRACT

A system and method are provided for treatment and disposal of water produced by converting a lighter hydrocarbon to a heavier hydrocarbon using a Fischer-Tropsch process. The system and method also provide for disposal of contaminants associated with the conversion process using a combustion chamber of at least one gas turbine. Water produced by the Fischer-Tropsch process may be used to wash or scrub synthesis gas in a synthesis gas water wash column prior to the synthesis gas entering a Fischer-Tropsch reactor. Contaminated water from the synthesis gas water wash column may be directed to a water stripping column which uses steam from the Fischer-Tropsch reactor to scrub or clean the contaminated water. A stream of contaminated steam and undesired contaminants preferably exits from the water stripping column and is directed to the combustion chamber of at least one gas turbine. A stream of stripped or cleaned water preferably exits from the water stripping column and is directed to a water disposal facility and/or returned to the synthesis gas water wash column.

20 Claims, 2 Drawing Sheets

U.S. PATENT DOCUMENTS

| | | | |
|---|---|---|---|
| 4,184,322 A | 1/1980 | Paull et al. ............... | 60/39.02 |
| 4,309,359 A | 1/1982 | Pinto ........................ | 518/705 |
| 4,315,893 A | 2/1982 | McCallister ............... | 422/109 |
| 4,338,292 A | 7/1982 | Duranleau ................. | 423/656 |
| 4,341,069 A | 7/1982 | Bell et al. ................. | 60/39.02 |
| 4,345,915 A | 8/1982 | Vakil et al. ................ | 48/197 |
| 4,372,920 A | 2/1983 | Zardi ........................ | 422/148 |
| 4,423,022 A | 12/1983 | Albano et al. ............. | 423/360 |
| 4,423,156 A | 12/1983 | Büssemeier et al. ....... | 518/717 |
| 4,434,613 A | 3/1984 | Stahl ........................ | 60/39.07 |
| 4,481,305 A | 11/1984 | Jorn et al. ................. | 518/705 |
| 4,492,085 A | 1/1985 | Stahl et al. ................ | 60/649 |
| 4,521,581 A | 6/1985 | Cascone et al. ........... | 60/39.02 |
| 4,522,939 A | 6/1985 | Minderhoud et al. ...... | 502/242 |
| 4,524,581 A | 6/1985 | Cascone et al. ........... | 60/39.07 |
| 4,528,811 A | 7/1985 | Stahl ........................ | 60/39.07 |
| 4,549,396 A | 10/1985 | Garwood et al. .......... | 60/39.02 |
| 4,579,985 A | 4/1986 | Minderhoud et al. ...... | 585/310 |
| 4,579,986 A | 4/1986 | Sie ........................... | 585/324 |
| 4,587,008 A | 5/1986 | Minderhoud et al. ...... | 208/109 |
| 4,618,451 A | 10/1986 | Gent ........................ | 252/373 |
| 4,640,766 A | 2/1987 | Post et al. ................. | 208/111 |
| 4,678,723 A | 7/1987 | Wertheim .................. | 429/17 |
| 4,681,701 A | 7/1987 | Sie ........................... | 252/373 |
| 4,732,092 A | 3/1988 | Gould ....................... | 110/229 |
| 4,755,536 A | 7/1988 | Mauldin et al. ............ | 518/709 |
| 4,778,826 A | 10/1988 | Jezl et al. .................. | 518/703 |
| 4,833,140 A | 5/1989 | Weber et al. .............. | 514/343 |
| 4,833,170 A | 5/1989 | Agee ........................ | 518/703 |
| 4,869,887 A | 9/1989 | Van Dijk ................... | 423/359 |
| 4,894,205 A | 1/1990 | Westerman et al. ....... | 422/197 |
| 4,919,909 A | 4/1990 | Lesur et al. ............... | 423/360 |
| 4,946,660 A | 8/1990 | Denny et al. .............. | 423/230 |
| 4,973,453 A | 11/1990 | Agee ........................ | 422/190 |
| 4,999,029 A | 3/1991 | Lueth et al. ............... | 48/197 |
| 5,000,004 A | 3/1991 | Yamanaka et al. ......... | 60/723 |
| 5,026,934 A | 6/1991 | Bains et al. ............... | 585/314 |
| 5,028,634 A | 7/1991 | Fiato ........................ | 518/707 |
| 5,048,284 A | 9/1991 | Lywood et al. ............ | 60/39.02 |
| 5,080,872 A | 1/1992 | Jezl et al. .................. | 422/201 |
| 5,126,377 A | 6/1992 | Bessell ..................... | 518/714 |
| 5,177,114 A | 1/1993 | Van Dijk et al. ........... | 518/703 |
| 5,245,110 A | 9/1993 | Van Dijk et al. ........... | 585/946 |
| 5,295,350 A | 3/1994 | Child et al. ................ | 60/39.02 |
| 5,295,356 A | 3/1994 | Billy ......................... | 62/20 |
| 5,324,335 A | 6/1994 | Benham et al. ............ | 44/452 |
| 5,472,986 A | 12/1995 | van Dijk ................... | 518/705 |
| 5,477,924 A | 12/1995 | Pollack ..................... | 166/357 |
| 5,490,377 A | 2/1996 | Janes ........................ | 60/39.12 |
| 5,500,449 A | 3/1996 | Benham et al. ............ | 518/700 |
| 5,504,118 A | 4/1996 | Benham et al. ............ | 518/719 |
| 5,506,272 A | 4/1996 | Benham et al. ............ | 518/700 |
| 5,520,891 A | 5/1996 | Lee .......................... | 422/200 |
| 5,543,437 A | 8/1996 | Benham et al. ............ | 518/700 |
| 5,666,800 A | 9/1997 | Sorensen et al. .......... | 60/39.02 |
| 5,694,761 A | 12/1997 | Griffin, Jr. ................. | 69/39.05 |
| 5,733,941 A | 3/1998 | Waycuilis .................. | 518/703 |
| 5,861,441 A | 1/1999 | Waycuilis .................. | 518/703 |
| 5,938,975 A | 8/1999 | Ennis et al. ................ | 252/373 |
| 5,968,465 A * | 10/1999 | Koveal et al. ............. | 423/236 |
| 5,973,631 A | 10/1999 | McMullen et al. ......... | 341/144 |
| 5,980,840 A | 11/1999 | Kleefisch et al. .......... | 422/211 |
| 6,011,073 A | 1/2000 | Agee et al. ................ | 518/700 |
| 6,172,124 B1 | 1/2001 | Wolflick et al. ............ | 518/705 |
| 6,277,338 B1 | 8/2001 | Agee et al. ................ | 422/189 |
| 6,277,894 B1 | 8/2001 | Agee et al. ................ | 518/700 |
| 2001/0047040 A1 | 11/2001 | Agee et al. ................ | 518/704 |

OTHER PUBLICATIONS

"Gasoline from Natural Gas" by Keith, Oil and Gas Journal pp. 102–112, Jun. 15, 1945.

"Hydrogen Process Broadens Feedstock Range," Industry & Economic News, Chemical ENgineering, pp. 88–93, Jul. 9, 1962.

PCT International Search Report mailed Oct. 17, 1997 re PCT/US97/10733, 1997.

PCT International Search Report mailed Oct. 24, 1997 re PCT/US97/10732, 1997.

PCT International Search Report mailed Feb. 25, 1998 re PCT/US97/19722, 1998.

PCT International Search Report mailed Nov. 2, 2000 re PCT/US00/08371, 2000.

"Kinetics of the Fischer–Tropsch–Synthesis using a Nitrogen–Rich Synthesis Gas" by Kuntze, et al., Oil Gas –European Magazine 1/199, 1995.

"A New Concept for the Production of Liquid Hydrocarbons from Natural Gas in Remote Area" by Hedden, et al., Oil Gas –European Magazine, Mar. 1994.

"Production of Synthesis Gas by Catalytic Partial Oxidation of Methane with Air" by Jess, et al., Oil Gas –European Magazine, Apr. 1994.

"Improve Syngas Production using Autothermal Reforming" by Christensen, et al., Hydrocarbon Processing/Mar. 1994.

"Economical Utilization of Natural Gas to Produce Synthetic Petroleum Liquids" by Agee, et al., 75th Annual GPA Convention, Mar. 11–13, 1996, Denver, CO.

"The Mother Lode of Natural Gas" by Monastersky, Science New vol. 150, Nov. 9, 1996.

"The Fischer–Tropsch Synthesis" bu R.R. Anderson, Academic Press 1984.

"Chemicals Produced in a Commercial Fischer–Tropsch Process" by Dry, 1987 American Chemical Society, 1987.

"Make Syn Gas by Partial Oxidation" by Reed, et al., Hydrocarbon Processing, Sep. 1979.

"Malaysia, Shell Mull Gas to Products Project," Oil & Gas Journal, Sep. 16, 1985.

"The Magic of Designer Catalysts" by Bylinsky, Fortune, May 27, 1985.

"Conversion of Natural Gas to Liquid Fuels" by Alden, The Oil & Gas Journal, Nov. 9, 1946.

"Fischer–Tropsch Synthesis in Slurry Phase" bu Schleslinger, Industrial and Engineering Chemistry, Jun. 1951.

"Advances in Low Temperature Fischer–Tropsch Synthesis" by Jager, et al., Catalysis Today 1995.

"Fischer–Tropsch Processes Inestigated at the Pittsburgh Energy Technology Center since 1944" by Baird, et al., Ind. Eng. Chem. Prod. Res. Dev., 1980.

"Process Makes Mid–Distillates from Natural Gas", Oil & Gas Journal, Apr. 17, 1986.

"PFBC Clean–coal Technology. A new Generation of Combined–Cycle Plants to Meet the Growing World Need for Clean and Cost Effective Power.", ABB Carbon Marketing Department, S–612 82, FInspong, approx. Feb. 1998, Feb. 1998.

SYSTEM AND METHOD FOR TREATMENT OF WATER AND DISPOSAL OF CONTAMINANTS PRODUCED BY CONVERTING LIGHTER HYDROCARBONS INTO HEAVIER HYDROCARBON

TECHNICAL FIELD

The present invention is related to converting lighter hydrocarbons to heavier hydrocarbons and more specifically to cleaning water produced while converting the lighter hydrocarbons, disposing of undesired contaminants from the associated conversion process, and providing additional power for the conversion process and other uses including supplying additional compressed air for use in the conversion process.

BACKGROUND OF THE INVENTION

Synthesis gas, or "syngas," is a mixture of gases prepared as feedstock for a chemical reaction. It is primarily a mixture of carbon monoxide and hydrogen that may be used to make hydrocarbons or organic chemicals. Syngas may be produced for use as part of a Fischer-Tropsch process to convert lighter hydrocarbons (e.g., natural gas) to heavier hydrocarbons ($C_{5+}$).

The synthesis production of hydrocarbons by the catalytic reaction of carbon monoxide and hydrogen is well known and generally referred to as the Fischer-Tropsch process or reaction. Numerous catalysts have been used in carrying out the process. The Fischer-Tropsch reaction is very exothermic and temperature sensitive whereby temperature control is required to maintain a desired hydrocarbon product selectivity. The Fischer-Tropsch reaction can be characterized by the following general reaction:

$$2H_2 + CO \xrightarrow{\text{Catalyst}} CH_2\text{—} + H_2O$$

Water produced by the Fischer-Tropsch reaction is often contaminated with alcohol and other hydrocarbons. In addition, water produced during synthesis gas production may also contain contaminants. Therefore, the contaminated water should generally be cleaned prior to disposal or prior to any use for other purposes.

In the past a number of techniques have been used to dispose of contaminated water from Fischer-Tropsch processes. A water treatment facility typically has been necessary. Such a facility might use biological treatments, which are fairly capital intensive. An approach using a stripper has been suggested in U.S. Pat. No. 5,053,581, entitled "Process For Recycling And Purifying Condensate From A Hydrocarbon Or Alcohol Synthesis Process."

Two basic methods have been employed to produce synthesis gas used as a feedstock in Fischer-Tropsch reactions. The two methods are steam reforming, wherein one or more light hydrocarbons such as methane are reacted with steam over a catalyst to form the desired synthesis gas of carbon monoxide and hydrogen, and partial oxidation, wherein one or more light hydrocarbons are combusted or reacted sub-stoichiometrically to produce the desired synthesis gas.

The basic steam reforming reaction of methane is represented by the following formula:

$$CH_4 + H_2O \xrightarrow{\text{Catalyst}} CO + 3H_2$$

The steam reforming reaction is endothermic and a catalyst containing nickel is often used. The hydrogen to carbon monoxide ratio of the synthesis gas produced by steam reforming of methane is approximately 3:1.

Partial oxidation is the non-catalytic, sub-stoichiometric combustion of light hydrocarbons such as methane to produce the desired synthesis gas. The basic reaction is represented by the following formula:

$$CH_4 + \tfrac{1}{2}O_2 \rightarrow CO + 2H_2$$

The partial oxidation reaction is typically carried out using high purity oxygen which can be quite expensive. The hydrogen to carbon monoxide ratio of synthesis gas produced by the partial oxidation of methane is approximately 2:1.

In some situations the two basic methods may be combined. The combination of partial oxidation and steam reforming, known as autothermal reforming, wherein air may be used as a source of oxygen for the partial oxidation reaction has satisfactorily been used to produce synthesis gas. For example, U.S. Pat. Nos. 2,552,308 and 2,686,195 disclose low pressure hydrocarbon synthesis processes wherein autothermal reforming with air is used to produce synthesis gas for an associated Fischer-Tropsch reaction. One benefit of autothermal reforming is using exothermic heat from the partial oxidation reaction to supply necessary heat for the associated endothermic steam reforming reaction.

SUMMARY OF THE INVENTION

In accordance with teachings of the present invention, a system and method are provided for treatment and disposal of undesired products and/or contaminants produced by a Fischer-Tropsch process while converting lighter hydrocarbons to heavier hydrocarbons. Teachings of the present invention result in more efficient cleaning of water produced by the Fischer-Tropsch process. One or more gas turbines are preferably included for use in disposing of contaminants and/or other undesired products produced by the Fischer-Tropsch process. The gas turbine or turbines are preferably designed to accommodate supplying steam and/or heavily moisture laden air to an associated combustion chamber and gas expansion section.

One aspect of the present invention includes a system having one or more gas turbines, an autothermal reformer for producing synthesis gas, a synthesis gas water wash column, a Fischer-Tropsch reactor and a water stripping column. Water produced by the Fischer-Tropsch process is preferably separated from other Fischer-Tropsch products and directed to the synthesis gas water wash column to remove undesired contaminants from synthesis gas prior to entering the Fischer-Tropsch reactor. Contaminated water from the synthesis gas water wash column is preferably directed to the water stripping column. Suitable fluids such as steam and/or tail gas are preferably supplied to the water stripping column for use in removing gases, soluble compounds, and other undesired contaminants from the contaminated water. A stream of contaminated steam is preferably directed from the water stripping column to a combustion chamber of at least one of the gas turbines. The stripped water is preferably directed to a disposal facility and/or may be recycled for use in the synthesis gas water wash column.

Another aspect of the present invention includes providing systems and methods for treatment and disposal of undesired products and/or contaminants produced by any process which converts a synthesis gas to a desired product or products. Teachings of the present invention may be used with other conversion processes associated with a methanol reactor, dimethyl ether (DME), an ammonia reactor or any other reactor which converts a synthesis gas to a desired product or products.

BRIEF DESCRIPTION OF THE DRAWINGS

A more complete and thorough understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1A:
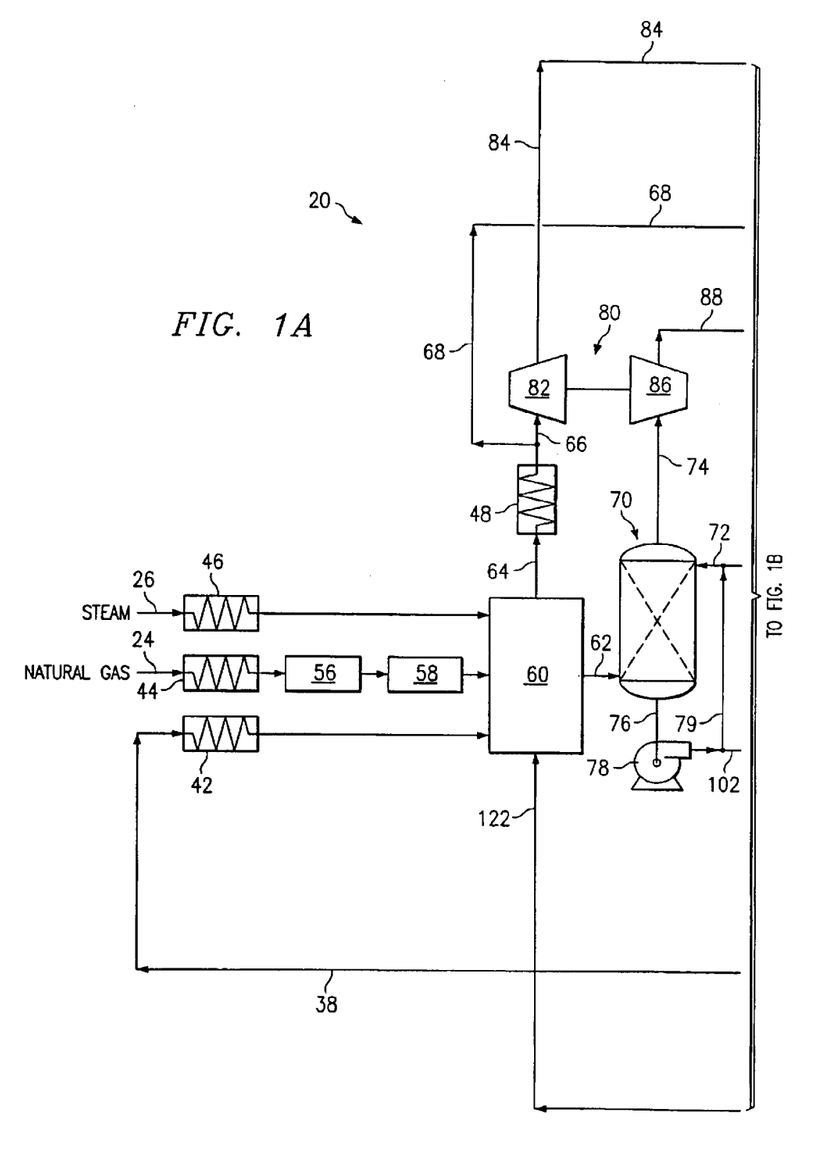
FIGS. 1A and 1B are schematic drawings showing one example of a process flow for converting lighter hydrocarbons to heavier hydrocarbons in accordance with teachings of the present invention.
Figure 1B:
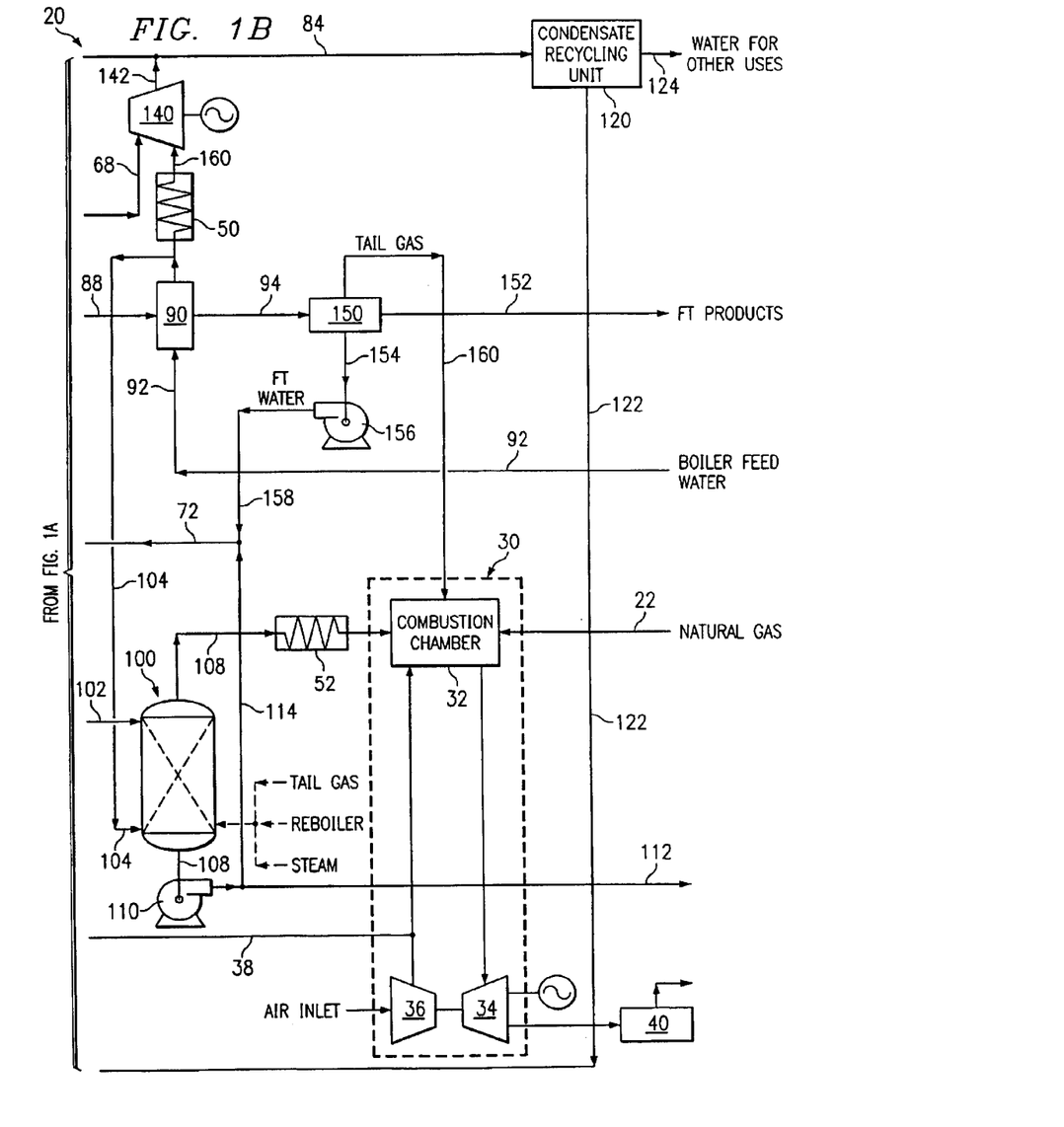

Preferred embodiments of the invention and its advantages are best understood by reference to FIGS. 1A and 1B, like numerals being used for like and corresponding parts of the various drawings.

System 20 as shown in FIGS. 1A and 1B preferably uses a Fischer-Tropsch process to convert lighter hydrocarbons, such as natural gas, to heavier hydrocarbons ($C_{5+}$) in accordance with teachings of the present invention. A plethora of heavier hydrocarbons are possible. See, e.g., the example products listed in International Publication WO 00/34414.

For the embodiment of the present invention as shown in FIGS. 1A and 1B, system 20 includes first turbine 30, heat recovery steam generator (HRSG) 40, autothermal reformer 60, synthesis gas water wash column 70, second turbine or second turbine 80, Fischer-Tropsch reactor 90, water stripping column 100, condensate recycling unit 120, and an auxiliary turbine 140. For some applications multiple gas turbines, heat recovery steam generators, autothermal reformers, or other synthesis gas generators, synthesis gas water wash columns, Fischer-Tropsch reactors, water stripping columns, and/or condensate recycling units may be satisfactorily used with each other in accordance with teachings of the present invention.

Various types of hydrocarbon gases or lighter molecular weight hydrocarbons may be supplied to system 20 for use in producing a wide variety of heavier hydrocarbons and/or liquid hydrocarbons. For purposes of explanation, system 20 and various features of the present invention will be described with respect to using natural gas as the lighter hydrocarbon and converting the natural gas to liquid hydrocarbons and other heavier hydrocarbons. A continuous source or stream of natural gas (not expressly shown) is preferably connected with natural gas conduits 22 and 24. Various types of commercially available control systems including appropriately sized valves and regulators (not expressly shown) may be used to provide desired natural gas flow rates through conduits 22 and 24.

Conduit 22 is used to supply natural gas to combustion chamber or combustor 32 of first turbine 30. As discussed later in more detail, the quantity of natural gas supplied to combustion chamber or combustor 32 may be varied depending upon the quantity and quality, (BTU content) of tail gas produced by the associated Fischer-Tropsch process and delivered by conduit 160 to combustor 32. Natural gas from conduit 22 may be used to start and run first turbine 30 when the associated Fischer-Tropsch process is not operating or when sufficient tail gas is not available.

Various types of oxygen containing gas(OCG) may be supplied to autothermal reformer 60. For the embodiment of the present invention as shown in FIGS. 1A and 1B compressed air is preferably supplied from compressor section 36 of first turbine 30 through conduit 38 to autothermal reformer 60. For some applications the oxygen containing gas may be enriched air which contains a higher concentration of oxygen than normally associated with ambient air. For other applications the oxygen containing gas may be substantially pure oxygen.

For the embodiment of the present invention as shown in FIG. 1B, first turbine 30 preferably includes combustion chamber 32, gas expansion section 34 and air compressor section 36. Gas expansion section 34 and air compressor section 36 are typically mechanically coupled with each other on a rotating shaft (not expressly shown). Combustion chamber 32 may be formed as an integral component of first turbine 30. First turbine 30 is preferably designed to accommodate supplying steam and/or heavily moisture ladened air to combustion chamber 32 and gas expansion section 34. Examples of such gas turbines include cascading, humidifying turbines which are used in a wide variety of commercial power generating applications.

For the embodiment of the present invention as shown in FIGS. 1A and 1B, ambient air may be supplied to compressor section 36 of first turbine 30. Hot combustion gases from combustion chamber 32 are preferably directed to expansion section 34 which provides required power for compressor section 36 to compress the ambient air. Exhaust gases exiting from expansion section 34 are preferably directed to heat recovery steam generator 40. As discussed later in more detail, heat recovery steam generator 40 preferably includes multiple tube sheets which allow transferring thermal energy from exhaust gases exiting from first turbine 30 to other fluid streams associated with system 20.

A portion of the compressed air exiting from compressor section 36 is preferably directed to combustion chamber 32. Conduit 38 is provided to direct another portion of the compressed air from compressor section 36 to autothermal reformer 60. For some applications conduit 38 preferably directs the compressed air through tube sheet 42, which while shown separately is associated with heat recovery steam generator 40, to preheat the air. Various control systems and regulators are commercially available so that the flow rate and temperature of the compressed air entering autothermal reformer 60 may be maintained within a desired range.

Conduit 24, which provides a stream of natural gas to autothermal reformer 60, is preferably coupled with tube sheet 44, which while shown separately is associated with heat recovery steam generator 40, to allow heating of the natural gas stream to a desired temperature range. Again, various control systems and regulators are commercially available to maintain both the desired flow rate and temperature of natural gas flowing to autothermal reactor 60 through conduit 24.

Natural gas is generally a mixture of light molecular weight hydrocarbons such as methane, ethane, propane and butane. A typically natural gas stream may have a composition of approximately eighty-five percent (85%) methane, ten percent (10%) ethane and the remaining five percent (5%) propane, butane and common nitrogen along with a wide variety of undesirable contaminants. Examples of such contaminants include hydrogen sulfide gas and other types of nitrogen and sulfur compounds. The specific composition of a natural gas stream may vary considerably depending upon characteristics of the associated underground hydrocarbon reservoir which produced the respective natural gas stream. For some underground hydrocarbon reservoirs the percentage of undesired contaminants may be substantial as compared to the percentage of desired methane gas.

For some applications, conduit 24 may also direct the natural gas stream to flow through feed pretreatment reactor or system 56 and/or feed deenrichment reactor or system 58. Various types of pretreatment systems and/or feed deenrichment systems may be satisfactorily used with the present invention based on characteristics of the light hydrocarbon such as natural gas which is supplied to autothermal reformer 60.

Feed pretreatment system 56 may be used to remove contaminants such as sulfur based compounds prior to the natural gas stream entering autothermal reformer 60. Feed pretreatment system 56 and feed deenrichment system 58 may be combined with each other and described as a "prereformer." Feed deenrichment system 58 may be provided to convert butane and/or propane gases present in the natural gas stream to methane for use in the synthesis processes associated with autothermal reformer 60. For many synthesis processes associated with autothermal reformer 60, a very high percentage of methane is preferred. Additional information concerning feed pretreatment systems and feed deenrichment systems may be found in copending U.S. patent applications Ser. No. 09/429,591 filed Oct. 28, 1999 entitled "System for Convering Light Hydrocarbons to Heavier Hydrocarbons With Separation of Water Into Oxygen and Hydrogen", now U.S. Pat. No. 6,277,338 and U.S. patent application Ser. No. 09/538,609 filed Mar. 29, 2000 entitled "System and Method for Converting Light Hydrocarbons Into Heavier Hydrocarbons With A Plurality of Synthesis Gas Subsystems." Published U.S. Patent Application US 2001/0047040 publication date Nov. 29, 2001 entitled "System and Method for Converting Light Hydrocarbons Into Heavier Hydrocarbons With A Plurality of Synthesis Gas Subsystem" also discloses pretreatment units.

For some applications the feed stream of light hydrocarbons flowing through conduit 24 to autothermal reformer 60 will be at a pressure in a range from approximately atmospheric to six hundred pounds per square inch gauge (600 psig). The feed stream of light hydrocarbons may be heated within tube sheet 44 to a temperature in the range of approximately five hundred degrees Fahrenheit (500° F.) to approximately one thousand degrees Fahrenheit (1000° F.). In a similar manner compressed air flowing through tube sheet 42 will preferably be heated to approximately the same temperature range of five hundred degrees Fahrenheit (500° F.) to approximately one thousand degrees Fahrenheit (1000° F.).

Steam is preferably supplied to autothermal reformer 60 through conduit 26 during start-up of the associated synthesis gas production process and as required to maintain the desired quality and quantity of synthesis gas flowing from autothermal reformer 60. The steam may be used to help control the hydrogen to carbon monoxide ($H_2$:CO) ratio of the synthesis gas. Tube sheet 46, which while shown separately is associated with heat recovery steam generator 40, may be used to heat the steam flowing through conduit 26 to the desired temperature range.

Boiler feed water may be supplied to autothermal reactor 60 from various sources. For the embodiment of the present invention as shown in FIGS. 1A and 1B boiler feed water from condensate recycling unit 120 preferably flows through conduit 122 to autothermal reformer 60. Condensate recycling unit 120 will be discussed later in more detail. Various control systems and regulators (not expressly shown) are commercially available to maintain the flow rate of boiler feed water supplied to autothermal reformer 60 within a desired range.

Various types of synthesis gas generators and/or reactors may be satisfactorily used as part of autothermal reformer 60. A single reactor vessel with both oxidation and reforming taking place is preferred. For some applications autothermal reformer 60 may include a reactor vessel (not expressly shown) with a burner (not expressly shown) connected to one end thereof. A steam reforming catalyst which often contains nickel may be disposed within the reactor vessel opposite from the burner. Boiler feed water from conduit 122 may be directed to one or more heat exchangers (not expressly shown) contained within autothermal reformer 60 to maintain the combustion reaction and the steam reforming reaction within desired temperature ranges. As discussed later in more detail, the boiler feed water will preferably be converted to steam during removal of excess heat energy from autothermal reformer 60.

During typical operation of autothermal reformer 60, a preheated and prereformed feed stream of light hydrocarbons from conduit 24 will be intimately mixed with a preheated stream of compressed air from conduit 38 and introduced into the ATR 60. The resulting oxidation is typically carried out at a temperature range of approximately fifteen hundred degrees Fahrenheit (1500° F.) to approximately twenty-five hundred degrees Fahrenheit (2500° F.) under sub-stoichiometric conditions whereby the light hydrocarbons are partially oxidized. A gas stream including nitrogen, unreacted light hydrocarbons, hydrogen, carbon monoxide and undesired contaminants is typically produced by the oxidation reaction.

The unreacted light hydrocarbons in the combustion gas stream preferably react with steam introduced into autothermal reformer 60 through conduit 26 in the presence of the reforming catalyst to produce additional hydrogen and carbon monoxide. Carbon dioxide (not expressly shown) may also be introduced into autothermal reformer 60 to react with unreacted light hydrocarbons to produce additional carbon monoxide and hydrogen. The combustion reaction and reforming reactions preferably occur as coexisting reactions that reach equilibrium within autothermal reformer 60.

The resulting synthesis gas stream generated within autothermal reformer 60 will typically include hydrogen, carbon monoxide, carbon dioxide, nitrogen, unreacted light hydrocarbons, and a wide variety of undesired contaminants. The synthesis gas stream is preferably directed through conduit 62 to synthesis gas water wash column 70.

The ratio of hydrogen to carbon monoxide in the synthesis gas stream produced by autothermal reformer 60 is preferably controlled, as close as possible, to a ratio of two to one (2:1) for a typical cobalt based Fischer-Tropsch catalysts (other ratios may be used for other catalysts) by adjusting the rates of steam, natural gas, compressed air and/or boiler feed water supplied to autothermal reformer 60. For some applications the ratio of hydrogen to carbon monoxide in the synthesis gas stream and/or the composition of the natural gas stream supplied to autothermal reformer 60 are monitored and used to change the flow rates of steam, compressed air and/or boiler feed water supplied to autothermal reactor 60 to maintain a substantially constant ratio of hydrogen to carbon monoxide at 2:1 in the synthesis gas entering water wash column 70.

Depending upon the resulting equilibrium state between the oxidation reaction and the steam reforming reaction which occur within autothermal reformer 60, a substantial amount of steam, produced by transferring heat energy to the boiler feed water, will exit from autothermal reformer 60 through conduit 64. The steam is preferably directed to tube sheet 48, which while shown separately is associated with heat recovery steam generator 40. A sufficient quantity of thermal energy or heat is preferably provided by tube sheet 48 to superheat the steam flowing through conduit 64. A substantial portion of the superheated steam preferably flows from tube sheet 48 through conduit 66 to steam expansion section 82 of second turbine 80 which also includes synthesis gas compressor section 86. Low pressure steam or exhaust steam exits from steam expansion section 82 and is preferably directed through conduit 84 to condensate recycling unit 120.

For some applications, the flow rate of steam exiting through conduit 64 may be greater than the flow rate of steam required to satisfactorily operate second turbine 80. During these operating conditions, excess high pressure or superheated steam may be directed from tube sheet 48 through conduit 68 to a steam expansion section of auxiliary turbine or third turbine 140. Exhaust steam or low pressure steam exiting from auxiliary turbine 140 preferably flows through conduit 142 and conduit 84 to condensate recycling unit 120. Second turbine 80 and auxiliary turbine 140 will be discussed later in more detail.

The synthesis gas exiting from autothermal reformer 62 will often contain various contaminants such as ammonia, hydrogen cyanide, other nitrogen based compounds and various contaminants associated with the natural gas stream. These contaminants may be harmful with respect to the Fischer-Tropsch catalyst (not expressly shown) contained within Fischer-Tropsch reactor 90. Various contaminants contained within the synthesis gas exiting from autothermal reformer 60 may also collect in or be incorporated within heavier hydrocarbons (waxes) produced by the associated Fischer-Tropsch process. These contaminants may cause problems with hydrocracking and/or refining of the heavier hydrocarbons produced by the associated Fischer-Tropsch process.

Synthesis gas water wash column 70 and water stripping column 100 cooperate with each other to assist in removing a substantial quantity of undesired contaminants contained in the synthesis gas exiting from autothermal reformer 60. Synthesis gas water wash column 70 and water stripping column 100 also cooperate with each other to assist in removing a substantial quantity of undesirable contaminants which may be contained within water produced by the associated Fischer-Tropsch's process.

Synthesis gas water wash column 70 may be generally described as a "packed column." Conduit 62 preferably directs synthesis gas from autothermal reformer 60 to enter at or near the bottom of synthesis gas water wash column 70. Water from conduit 72 preferably enters at or near the top of synthesis gas water wash column 70 and is sprayed over the packing (not expressly shown) contained therein. The general fluid flow paths within synthesis gas water wash column 70 may be described as an upward flow of synthesis gas and a counter current or downward flow of sprayed water. The counter current flow in cooperation with the packing results in the water removing or scrubbing contaminants such as ammonia, hydrogen cyanide, various nitrogen based compounds and other contaminants from the synthesis gas.

Washed or cleaned synthesis gas preferably exits from the top of synthesis gas water wash column 70 through conduit 74 and flows to compressor section 86 of second turbine 80. For some applications one or more condensers and/or separators (not expressly shown) may be connected with conduit 74 to remove water, other liquids and contaminates from the synthesis gas prior to entering compressor section 86.

Contaminated water containing various soluble gases and chemical compounds is preferably collected at the bottom of synthesis gas water wash column 70 and directed through conduit 76 to one or more pumps 78. The contaminated water may then be directed through conduit 102 to the top of water stripping column 100 and/or returned to the top of synthesis gas water wash column 70 through conduit 79. The amount of contaminated water directed to water stripping column 100 and the amount of water returned to synthesis gas water wash column 70 will depend upon various factors such as overall operating condition of system 20, quality and quantity of water produced by the associated Fischer-Tropsch process and quantity and type of contaminants contained in the natural gas feed stream supplied to autothermal reformer 60.

As previously noted, clean or washed synthesis gas exits from the top of synthesis gas water wash column 70 through conduit 74 and flows to compressor section 86 of syngas compressor 80. From compressor section 86 the synthesis gas will flow through conduit 88 to Fischer-Tropsch reactor 90. For some applications the synthesis gas will preferably enter Fischer-Tropsch reactor 90 within a pressure range of approximately one hundred to five hundred pounds per square inch gauge (100–500 psig) and a temperature of approximately four hundred degrees Fahrenheit (400° F.).

For some applications Fischer-Tropsch reactor 90 may be generally described as a tubular reactor containing a fixed bed (not expressly shown) of Fischer-Tropsch catalyst such as a Group VIII metal based catalyst. A number of supports and promoters may be included within the fixed catalyst bed. For example, the Fischer Tropsch catalyst may be formed from cobalt supported by silica, alumni or silica alumni materials. Fischer-Tropsch reactors having moving catalyst beds may also be used. A wide variety of Fischer-Tropsch reactors and catalysts may be satisfactorily used with the present invention.

For the embodiment of the present invention as shown in FIGS. 1A and 1B synthesis gas flows from conduit 88 through Fischer-Tropsch reactor 90. Boiler feed water is preferably supplied to Fischer-Tropsch reactor 90 from conduit 92. The temperature within Fischer-Tropsch reactor 90 is preferably maintained, at least in part by the boiler feed water, in a range from about three hundred fifty degrees Fahrenheit (350° F.)to about five hundred fifty degrees Fahrenheit (550° F.). One or more heat exchangers (not expressly shown) may be provided within Fischer-Tropsch reactor 90 for use in maintaining the desired temperature range by converting boiler feed water to steam.

When hydrogen and carbon monoxide within the synthesis gas contacts the Fischer-Tropsch catalyst, heavier hydrocarbons and water will be formed. The resulting Fischer-Tropsch product stream which includes both desired heavier and/or liquid hydrocarbons, water, unreacted synthesis gas, and various contaminants such as alcohols will exit from Fischer-Tropsch reactor 90 through conduit 94.

The Fischer-Tropsch product stream is preferably directed by conduit 94 to condenser/separator 150. While condenser/separator 150 is shown as a single unit, it may include a plurality of condenser/separators. Within condenser/ separator 150 heavier hydrocarbons and water contained within the Fischer-Tropsch product stream are preferably condensed and separated from each other. The heavier hydrocarbons may exit from condenser/separator 150 through conduit 152. Fischer-Tropsch water preferably exits from condenser/separator 150 through conduit 154 to pump 156. From pump 156 the Fischer-Tropsch water is directed through conduit 158 which is preferably coupled with conduit 72. Thus, water produced by the associated Fischer-Tropsch process will preferably flow from condenser/separator 150 through pump 156, conduit 158 and conduit 72 to the top of synthesis gas water wash column 70. The Fischer-Tropsch water exiting from condenser/separator 150 will often contain organic alcohols and various soluble gases and chemical compounds.

After heavier hydrocarbons and water are condensed and separated from the Fischer-Tropsch product stream, unreacted synthesis gas and various contaminants may also be separated to form a residual gas or tail gas stream. The residual gas or tail gas stream preferably exits from condenser/separator 150 through conduit 160. For a typical Fischer-Tropsch process, the tail gas will typically include nitrogen, unreacted hydrogen, carbon monoxide, light hydrocarbons and carbon dioxide. For the embodiment of the present invention as shown in FIGS. 1A and 1B, conduit 160 preferably directs the tail gas to combustion chamber 32 of first turbine 30.

For some applications, the tail gas may be directed to one or more additional Fischer-Tropsch reactors (not expressly shown) and/or refrigeration/condensing units (not expressly shown) to form additional heavy weight hydrocarbons or remove additional heavy weight hydrocarbons and water from the tail gas. The heavier hydrocarbon product stream flowing through conduit 152 may be directed to a wide variety of separators, conventional fractioning units and/or hydrocracking units (not expressly shown). For some applications one or more combustion-enhancing catalysts may be provided within combustion chamber 32 to assist with the combustion of tail gas and/or natural gas supplied thereto.

Fischer-Tropsch reactor 90 will typically produce a substantial quantity of steam from using boiler feed water for temperature control. Conduit 104 is preferably provided to direct steam from Fischer-Tropsch reactor 90 to the bottom of water stripping column 100. For some applications the quantity of steam produced by Fischer-Tropsch reactor 90 may be greater than the quantity of steam required for satisfactory operation of water stripping column 100. This excess steam may be directed through tube sheet 50, which while shown separately is associated with heat recovery steam generator 40, to further heat it and form high pressure or superheated steam which is then directed for auxiliary turbine 140. As previously noted, high pressure steam may also be supplied to auxiliary turbine 140 from autothermal reactor 60 through conduit 68. Auxiliary turbine 140 may be used for various purposes such as compressing additional air, running one or more electrical generators or performing any other auxiliary work as desired.

Exhaust steam or low pressure steam preferably exits from auxiliary turbine 140 through conduit 142 which is preferably coupled with conduit 84. The low pressure steam from both second turbine 80 and auxiliary turbine 140 is directed to condensate recycling unit 120. The low pressure steam is preferably condensed to water and any undesired impurities or contaminants removed. The resulting water may be purified and cleaned to meet the requirements for boiler feed water supplied to autothermal reactor 60 and Fischer-Tropsch reactor 90. In addition boiler feed water may be provided to the tube side of both autothermal reformer 60 and Fischer-Tropsch reactor 90 to provide desired cooling by converting the boiler feed water to steam. For the embodiment of the present invention as shown in FIGS. 1A and 1B conduit 122 directs boiler feed water from condensate recycling unit 120 to autothermal reformer 60. A portion of the boiler feed water flowing through conduit 122 may also be directed through conduit 92 to Fischer-Tropsch reactor 90.

For some applications the Fischer-Tropsch process associated with system 20 may produce more water than is required to satisfy associated boiler feed water requirements of autothermal reactor 60 and Fischer-Tropsch reactor 90. This excess water may be directed through conduit 124 for other uses. Depending upon the specific nature of these other uses, condensate recycling unit 120 may also clean and purify the excess water to meet applicable requirements of these other uses. Various types of conventional condensers, separators, filters and water purification systems (not expressly shown) may be included within condensate recycling unit 120.

As previously noted, contaminated water preferably flows from synthesis gas water wash column 70 through pump 78 and conduit 102 to the top of water wash column 100. Water wash column 100 may be described as a packed column with counter current flow. Contaminated water from conduit 102 preferably enters near the top of water wash column 100 and is sprayed over the associated packing (not expressly shown). Steam from Fischer-Tropsch reactor 90 preferably flows through conduit 104 and enters near the bottom of water wash column 100 and is directed upwards over the associated packing.

Contact between the contaminated water, packing and low pressure steam will typically result in removal of hydrogen cyanide, ammonia, other gases and contaminants contained within the water. The steam from Fischer-Tropsch reactor 90 cleans or scrubs the contaminated water similar to the manner in which Fischer-Tropsch water from condenser/separator 150 is used to clean or scrub synthesis gas within synthesis gas water wash column 70. Contaminated steam preferably exits from the top of water wash column 100 and is directed through conduit 108 to combustion chamber 32. For some applications the contaminated steam within conduit 108 may also be directed through tube sheet 52, which while shown separately is associated with heat recovery steam generator 40. Thus, the temperature of contaminated steam entering combustion chamber 32 may be maintained within a desired range to assist with the combustion process and operation of first turbine 30.

The contaminated steam entering combustion chamber 32 may contain a wide variety of undesirable compounds such as hydrogen cyanide, ammonia and other contaminants removed from the synthesis gas within water wash column 70 and contaminants such as organic alcohols and soluble compounds removed from the Fischer-Tropsch water supplied to synthesis gas water wash column 70. These undesirable compounds and contaminants may then be burned or incinerated within combustion chamber 32.

For some applications, tail gas from separator/condenser 150 may also be directed to the bottom of water wash column 100 to aid in scrubbing and/or cleaning water entering from conduit 102. The tail gas may be used in combination with steam or separately. Also, steam may be supplied to the bottom or lower portion of water wash column 100 from a wide variety of sources in addition to Fischer-Tropsch reactor 90. For some applications, water exiting from the bottom of water wash column 100 may be directed to a reboiler (not expressly shown) and converted into steam which then enters at or near the top of water wash column 100. Various types of hot oil reboilers are available for use with the present invention.

Relatively clean or "stripped" water preferably exits from the bottom of water wash column 100 through conduit 108 to pump 110. The relatively clean or stripped water may then be directed to other uses through conduit 112, such as boiler feed water makeup, or returned to the top of synthesis gas water wash column 70 by conduit 114. The amount of water flowing through conduit 114 will depend in part upon the quantity and quality of Fischer-Tropsch water available from condenser/separator 150.

During normal operation of system 20, tail gas supplied to combustion chamber 32 will be a primary source of energy for operating first turbine 30. The tail gas also assists with combustion of contaminants and undesirable chemical compounds contained in the contaminated steam flowing from water wash column 100.

The term "fluid" is used within this patent application to include any gas, liquid, or mixture of gases and liquids associated with converting a synthesis gas to a desired product or products. A wide variety of heavy molecular weight hydrocarbons, such as waxes, and undesirable contaminants may be entrained within the fluids produced by a Fischer-Tropsch process.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A Fischer-Tropsch process for converting a light hydrocarbon gas to a heavier hydrocarbon wherein the Fischer-Tropsch process comprises:
   supplying desired quantities of the light hydrocarbon gas and an oxygen containing gas to a synthesis gas generator;
   producing synthesis gas within the synthesis gas generator;
   directing the synthesis gas from the synthesis gas generator to a synthesis gas water wash column to remove contaminants from the synthesis gas;
   directing synthesis gas from the water wash column to a Fischer-Tropsch reactor;
   producing the heavier hydrocarbons along with water and contaminants in the Fischer-Tropsch reactor; and
   directing at least a portion of the water produced by the Fischer-Tropsch reactor to the synthesis gas water wash column.

2. The Fischer-Tropsch process of claim 1 further comprising the oxygen containing gas selected from the group consisting of air and enriched air.

3. The Fischer-Tropsch process of claim 1 wherein the synthesis gas generator comprises an autothermal reformer.

4. The Fischer-Tropsch process of claim 3 further comprising:
   supplying boiler feed water to the autothermal reactor to maintain a desired temperature range for the production of synthesis gas by converting the boiler feed water to steam;
   directing the steam produced from the boiler feed water in the autothermal reformer to an expansion section of a syngas turbine;
   directing a portion of the steam produced from the boiler feed water in the autothermal reformer to an auxiliary turbine for use in producing electrical power.

5. The Fischer-Tropsch process of claim 4 further comprising:
   directing steam exiting from the expansion section of the second turbine to a condensate recycling unit to produce boiler feed water;
   directing at least a first portion the boiler feed water to the Fischer-Tropsch reactor; and
   directing at least a second portion of the boiler feed water to the autothermal reformer.

6. The Fischer-Tropsch process of claim 4 further comprising:
   directing the steam produced from the boiler feed water in the autothermal reformer to an auxiliary turbine;
   directing steam exiting from the auxiliary turbine to a condensate recycling unit to produce at least a portion of the boiler feed water; and
   directing at least a portion of the boiler feed water to the autothermal reformer and the Fischer-Tropsch reactor to maintain respective desired temperature ranges therein by converting the boiler feed water to steam.

7. The Fischer-Tropsch process of claim 1 further comprising:
   directing contaminated water and any undesirable fluids from the synthesis gas water wash column to a water stripping column;
   directing steam from the Fischer-Tropsch reactor to the water stripping column;
   converting at least a portion of the contaminated water and any undesirable contaminants into a mixture of contaminated steam and undesirable gases;
   directing the mixture of contaminated steam and undesirable gases to a combustion chamber; and
   directing stripped water from the water stripping column to a disposal facility.

8. The Fischer-Tropsch process of claim 1 wherein the hydrocarbon gas further comprises methane.

9. The Fischer-Tropsch process of claim 1 wherein the hydrocarbon gas further comprises natural gas.

10. The Fischer-Tropsch process of claim 1 further comprising directing contaminated steam to the combustion chamber of a first turbine.

11. A Fischer-Tropsch process for converting light hydrocarbons to heavier hydrocarbons wherein the Fischer-Tropsch process comprises:
    compressing air in a compressor section of a first turbine for use in the Fischer-Tropsch process;
    supplying a first portion of the compressed air from the compressor section to a combustion chamber associated with the first turbine;
    mixing a second portion the compressed air from the first turbine with steam and the light hydrocarbons in a first reactor to produce a synthesis gas which includes carbon monoxide, hydrogen and undesirable fluids;
    directing the synthesis gas, water and undesirable contaminants from the first reactor to a synthesis gas water wash column;
    directing synthesis gas from the synthesis gas water wash column to a compressor section of a syngas turbine;
    supplying boiler feed water to the first reactor to maintain a desired temperature range for production of the synthesis gas by converting the boiler feed water to steam;

directing the steam produced from the boiler feed water by the first reactor to an expansion section of a syngas turbine;

directing compressed synthesis gas from the compressor section of the syngas turbine to a Fischer-Tropsch reactor to convert at least a portion of the synthesis gas to Fischer-Tropsch products including the heavier hydrocarbons, water and various contaminants;

separating any unconverted portion of the synthesis gas and lighter hydrocarbons from the heavier hydrocarbons and water to provide a tail gas;

mixing at least a portion of the tail gas with the first portion of the compressed air in the combustion chamber of the first turbine to produce combustion gases which are directed to an expansion section of the first turbine; and separating the water from the heavier hydrocarbons and directing at least a portion of the water to the synthesis gas water wash column to remove at least a portion of the undesirable contaminants from the synthesis gas prior to the synthesis gas entering the compressor section of the syngas turbine.

12. The Fischer-Tropsch process of claim 11 further comprising:

removing ammonia, hydrogen cyanide and any other nitrogen bearing compounds from the synthesis gas within the synthesis gas water wash column;

directing contaminated water containing the ammonia, hydrogen cyanide and other nitrogen bearing compounds to a water stripping column; and directing steam from the Fischer-Tropsch reactor to the water stripping column.

13. The Fischer-Tropsch process of claim 11 further comprising:

directing contaminated water from the synthesis gas water wash column to a water stripping column; and supplying steam to the water stripping column to clean the contaminated water and produce a stream of stripped water and a stream of contaminated steam.

14. The Fischer-Tropsch process of claim 13 further comprising mixing a tail gas from the Fischer-Tropsch reactor with the steam supplied to the water stripping column.

15. The Fischer-Tropsch process of claim 13 further comprising directing the stream of contaminated steam to the combustion chamber of the first turbine.

16. The Fischer-Tropsch process of claim 11 further comprising directing a portion of the steam produced by the Fischer-Tropsch reactor to an auxiliary turbine.

17. The Fischer-Tropsch process of claim 16 further comprising directing a portion of the superheated steam to the auxiliary turbine.

18. The Fischer-Tropsch process of claim 16 further comprising:

superheating the steam produced from the boiler feed water in the first reactor; and directing steam exiting from the auxiliary turbine to the condenser recycling unit.

19. The Fischer-Tropsch process of claim 11 further comprising:

directing a mixture of the heavier hydrocarbons and water produced by the Fischer-Tropsch reactor and any unreacted synthesis gas to a separation unit; and separating the mixture into a tail gas stream, a liquid hydrocarbon stream and a Fischer-Tropsch water stream.

20. The Fischer-Tropsch process of claim 19 further comprising:

directing the tail gas to the combustion chamber of the first turbine; and directing at least a portion of the Fischer-Tropsch water to the synthesis gas water wash column.

* * * * *